United States Patent Office 3,534,006
Patented Oct. 13, 1970

3,534,006
METHODS OF POLYMERIZING ALPHA-OLEFINS WITH A TRANSITION METAL AND A BIS(DI-ALKYLALUMINUMOXY)ALKANE COMPOUND
Tadami Kamaishi and Seikichi Matsuhisa, Ohtsu-shi, Japan, assignors to Toyo Rayon Kabushiki Kaisha, Tokyo, Japan
Filed Mar. 21, 1967, Ser. No. 624,908
Claims priority, application Japan, Mar. 25, 1966, 41/17,925; June 24, 1966, 41/40,643
Int. Cl. C08f 1/42, 1/56, 3/10
U.S. Cl. 260—80.78       22 Claims

ABSTRACT OF THE DISCLOSURE

A method of polymerizing alpha-olefins (for example propylene) in the presence of a novel catalyst comprising (1) the compounds of a transition metal of Groups IV–A, V–A and VI–A of the Periodic Table (for example titanium trichloride) and (2) bis(dialkylaluminumoxy) alkane compound (for example bis(diethylaluminumoxy) butane-1,3) or comprising (1), (2) and (3) organic or inorganic compounds containing a nitrogen, phosphorus or sulfur atom. The obtained polyalpha-olefins are very highly crystalline.

---

Figure 1:
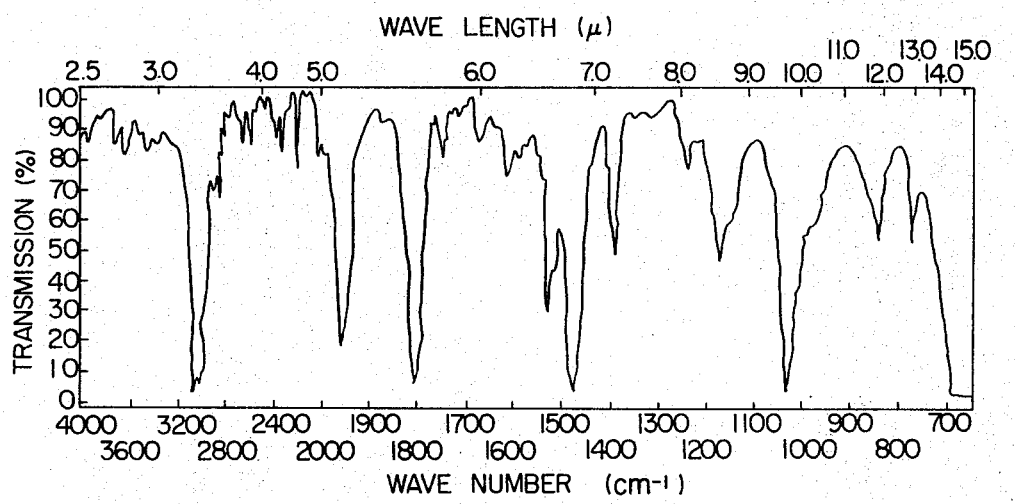

This invention relates to new methods of polymerizing alpha-olefins. More particularly, this invention relates to new methods of polymerizing alpha-olefins whereby alpha-olefins are polymerized to crystalline solid polymers in the presence of a novel catalyst, and also to the novel catalysts to be used in the foregoing methods of polymerizing alpha-olefins.

As a result of our research in the methods of polymerizing alpha-olefins to solid polymers, we discovered that it was possible to polymerize alpha-olefins to excellent crystalline solid polyolefin polymers in the presence of the novel catalyst of this invention which differs completely from those of the prior arts. This invention was thus perfected on the basis of the foregoing discovery.

According to this invention, the alpha-olefins are polymerized in the presence of a catalyst comprising (1) at least one first ingredient selected from the group consist of the compounds of transition metal of Groups IV–A, V–A and VI–A of the Periodic Table and (2) at least one second ingredient, selected from the bis(dialkylaluminumoxy)alkane compound of the formula (I)
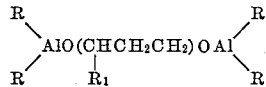

wherein R is a lower alkyl radical of 1–4 carbon atoms and $R_1$ is a hydrogen atom or methyl radical.

Further, according to another mode of this invention very highly crystalline polyalpha-olefins can be obtained by polymerizing alpha-olefins using as a catalyst a composition obtained by adding to the foregoing catalyst composition comprising said first ingredient and said second ingredient, as a third ingredient, at least one of the various organic and inorganic compounds containing either nitrogen, phosphorus or sulfur, such as hereinafter enumerated.

The compounds of transition metal of Groups IV–A, V–A and VI–A, the first ingredient of the catalyst of this invention are chosen from said Group IV–A metal compounds such as titanium compounds and zirconium compounds, said Group V–A metal compounds such as vanadium compounds and niobium compounds, and said Group VI–A metal compounds such as chromium compounds and tungsten compounds. Of the foregoing transition metal compounds, preferably used in this invention are the titanium, zirconium or vanadium compounds, such as the halides, oxyhalides, acetylacetonates, alcoholates, sulfonates and phosphates thereof. Specific examples include the halides such as $TiCl_2$, $TiCl_3$, $TiCl_4$, $TiBr_3$, $TiI_3$, $ZrCl_4$, $ZrBr_3$, $VCl_3$, $CrCl_3$ and $MoCl_5$, the oxyhalides such as $TiOCl_2$, $TiOBr_2$, $ZrOCl_2$, $ZrOBr_2$, $VOCl_3$ and $VOI_3$, the acetylacetonates such as titanium acetylacetonate, zirconium acetylacetonate and vanadium acetylacetonate, the alcoholates such as titanium butoxide, titanium isopropoxide, zirconium tetrabutoxide and vanadium tetrabutoxide sulfonates such as titanium sulfonate, zirconium sulfonate and vanadium sulfonate, and phosphates such as titanium phosphate, zirconium phosphate and vanadium phosphate. The organic metal halides such as dicyclopentadienyl titanium dichloride and bisdiethylamino titanium dichloride are also usable. Of the foregoing specific examples, the halides such as the chlorides are especially to be preferred.

In polymerizing propylene and the alpha-olefins higher than that, titanium trichloride is especially convenient.

Titanium trichloride can be obtained by the reduction of titanium tetrachloride with, for example, hydrogen or metals such as Na, K, Al, Zn, Sb and Cu. Titanium trichloride can also be obtained by such means as reacting titanium tetrachloride with an organoaluminum compound, which is used as the aforesaid second ingredient in the present invention or other alkyl aluminum compounds, or also by the pyrolysis of alkyl titanium trichloride.

The first ingredient compounds may contain in various forms those substances which become contained therein during the process of their manufacture. According to this invention, the aforesaid compounds which have been activated by the various known activation treatments may also be used. If these compounds are solids, they can be used in the invention method after having been heat treated, ground and subjected to a pretreatment with an organic aluminum material in customary manner.

The bis(dialkylaluminumoxy)alkane compounds of Formula I, the second ingredient of the catalyst of this invention, include bis(dialkylaluminumoxy)propane-1,3, the compounds in the case $R_1$ of the formula is a hydrogen atom, and bis(dialkylaluminumoxy)butane-1,3, the compounds in the case $R_1$ is methyl radical. As specific examples of the foregoing bis(dialkylaluminumoxy)propane-1,3, included are bis(dimethylaluminumoxy)propane-1,3, bis(diethylaluminumoxy)propane-1,3, bis(di-n-propylaluminumoxy)propane - 1,3, bis(diisobutylaluminumoxy)propane-1,3 and dimethyl aluminum-diethyl-aluminum oxypropane-1,3. On the other hand, specific examples of bis(dialkylaluminumoxy)butane-1,3 include bis(dimethylaluminumoxy)butane - 1,3, bis(diethylaluminumoxy)butane-1,3, bis(diisobutylaluminumoxy)butane-1,3 and dimethyl aluminum-diethyl aluminum oxybutane-1,3. In this invention, bis(diethylaluminumoxy)propane-1,3 or bis(diethylaluminumoxy)butane-1,3 is preferably used.

The hereinbefore described second ingredient compounds of the catalyst of this invention are novel compounds that have been made by us. These compounds possess powerful polymerization activity and are convenient to manage since their volatility is small and they are not ignitable and do not fume.

The method of this invention fully proceeds in the presence of the catalyst composed of the foregoing first and second ingredient compounds. However, when alpha-olefins are polymerized in the presence of a catalyst composed of the aforesaid first and second ingredient compounds to which have been further added the hereinafter enumerated third ingredient compounds comprising the organic or inorganic compounds containing a nitrogen, phosphorus or sulfur atom, polyalpha-olefins of still higher crystallinity can be obtained.

The foregoing third ingredient compounds, the organic or inorganic compounds containing a nitrogen, phosphorus or sulfur atom, include the following compounds:

(a) Compounds of the formula $$R_1R_2R_3N$$

wherein $R_1$, $R_2$ and $R_3$ are each a hydrogen atom or a $C_{1-12}$ hydrocarbon radical.

They include alkylamines such as dimethylamine, ethylamine, di-n-butylamine, di-n-hexylamine, triethylamine and tri-n-butylamine, cycloalkylamines such as cyclohexylamine, N - methyl cyclohexylamine, cycloheptylamine and cyclooctylamine, aralkylamines such as benzylamine and alphaphenylethylamine, arylamines such as aniline, N,N - dimethylaniline, diphenylamine, phenylnaphthylamine and naphthylamine, and bicycloalkylamines such as bornylamine, fenchylamine and menthylamine.

(b) Compounds of the formula wherein $R_1$ is a hydrogen atom or a $C_1$–$C_{12}$ hydrocarbon radical, and $R_2$ is a divalent $C_{2-12}$ hydrocarbon radical.

The hydrocarbon radicals of $R_1$ and the alkenyl radicals such as ethyl, hexyl and octyl and the alkenyl radicals such as vinyl, propenyl, isopropenyl and 2-hexenyl. On the other hand, the divalent $C_{1-12}$ hydrocarbon radicals of $R_2$ denote the divalent radicals which form a 3-, 5- or 6-membered heterocyclic ring along with a nitrogen atom, or the divalent radicals which form an aryl condensation ring with these heterocyclic rings. Specific examples of these compounds include the compound having a 3-membered heterocyclic ring such as ethylene imine, the compounds having a 5-membered heterocyclic ring such as pyrrole, pyrrolidine, N-methyl pyrrolidine, N-vinyl pyrrolidine and N-octyl pyrrolidine, the compounds having a 6-membered heterocyclic ring such as piperidine, N-ethyl piperidine, N-vinyl piperidine and N-nonyl piperidine. On the other hand, specific examples of the compounds having an aryl condensation ring with the aforesaid heterocyclic ring include such compounds as indole, N-methyl indole, skatole, carbazole and N-vinyl carbazole.

(c) Compounds of the formula wherein $R_1$ is a hydrogen atom or a $C_{1-8}$ hydrocarbon radical, and $R_2$ is a divalent $C_{5-18}$ hydrocarbon radical.

The hydrocarbon radicals of $R_1$ are alkyl radicals such as methyl, ethyl, heptyl and octyl. On the other hand, the divalent $C_{5-18}$ hydrocarbon radicals denote either the divalent radicals which form a heterocyclic ring with the —N=C— of the formula or the divalent radicals which form an aryl condensation ring with the heterocyclic ring.

Specific examples include the compounds having a 6-membered heterocyclic ring such as pyridine, picoline (2-methyl pyridine), 2-ethyl pyridine and 2,6-dimethyl pyridine. On the other hand, the compounds having an aryl condensation ring with the heterocyclic ring include such as quinoline, isoquinoline, 2-methyl quinoline and acridine.

(d) Organic compounds containing two nitrogens in the molecular construction and having a molecular weight less than 400.

As these compounds can be mentioned the alkyl diamines such as ethylene diamine, the aryldiamines such as benzidine, the compounds having a 6-membered heterocyclic ring such as pyrazine, piperadine, o,o'-dipyridil and nicotine, and the compounds having an aryl condensation ring with the aforesaid heterocyclic ring such as quinoxaline and o-phenanthroline.

(e) Compounds of the formula wherein $R_1$ is a hydrogen atom or a $C_{1-8}$ hydrocarbon radical, and $R_2$ and $R_3$ are either and halogen atom or a hydrocarbon radical.

Of the foregoing compounds having hydrocarbon radicals, those having the alkyl radicals are preferably used.

Specific examples are melamine, hexamethylamelamine, hexaethylmelamine and 2,4-bis-(diethylamino)-6-n-butyl-s-triazine and 2-diethylamino-4,6-dichloro-s-triazine.

(f) Compounds of the formula wherein $R_1$, $R_2$, $R_3$, $R_4$, $R_5$, $R_6$, $R_7$ and $R_8$ are each a halogen atom or —N(R')$_2$ of which R' is a hydrogen atom or a $C_{1-8}$ hydrocarbon radical.

Of the foregoing compounds, those in which the hydrocarbon radicals are alkyl radicals such as methyl, ethyl, and heptyl are preferred.

As the foregoing compounds, included are such as hexachloro-1,3,5-cyclotriphosphazatriene, 2,4,6-trichloro-2,4,6-tris-(dimethylamino) - 1,3,5-cyclotriphosphazatriene and hexakis(diethylamino)-1,3,5-cyclotriphosphazatriene.

(g) Compounds of the formula wherein $R_1$ is a hydrogen atom or a $C_{1-8}$ hydrocarbon radical, $R_2$ is a $C_{1-8}$ hydrocarbon radical, X is either a $C_{1-12}$ hydrocarbon radical or a halogen atom, and $n$ is an integer from 1 to 4.

Of the foregoing compounds, those whose hydrocarbon radical are alkyl radicals such as methyl, ethyl, propyl and hexyl are preferably used.

These compounds include such as tris(dimethylamino) monochlorosilane, bis(diethylamino)dichlorosilane, diethylaminotrichlorosilane, tetrakis(dimethylamino)silane and bis(dimethylamino)dimethylsilane.

(h) Compounds of the formula wherein $R_1$ and $R_2$ are each a $C_{1-8}$ hydrocarbon radical.

Of the foregoing compounds, those whose hydrocarbon radicals are alkyl radicals such as methyl, ethyl and heptyl are preferred.

As such compounds, mention can be made of hexamethyl trisilazane, octamethyl tetrasilazane and hexaethyl trisilazane.

(i) Compounds of the formula

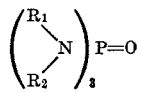

wherein $R_1$ and $R_2$ are each a $C_{1-8}$ hydrocarbon radical.

Of the foregoing compounds, those whose hydrocarbon radicals are alkyl radicals such as methyl, ethyl and butyl are conveniently used.

Typical of these compounds is hexamethyl phosphorictriamide.

(j) Compounds of the formula $$(R_1O)(R_2O)(R_3O)P=O_n$$

wherein $R_1$, $R_2$ and $R_3$ are each a $C_{1-8}$ hydrocarbon radical, and $n$ is an integer from 0 to 1.

Of the foregoing compounds, those whose hydrocarbon radicals are alkyl radicals such as methyl, ethyl, propyl and butyl and aryl radicals such as phenyl and cregyl are preferably used.

These compounds include trimethyl phosphite, trimethyl phosphate, triethyl phosphite, triethyl phosphate, tri-n-butylphosphite, tri-n-butylphosphate, triphenylphosphate, tricregylphosphite and diphenylcregylphosphite.

(k) Compounds of the formula $$R_1R_2R_3P=O_n$$

wherein $R_1$, $R_2$ and $R_3$ are each either a hydrogen atom or a $C_{1-8}$ hydrocarbon radical, and $n$ is an integer from 0 to 1.

Of the foregoing compounds, those whose hydrocarbon radicals are alkyl radicals such as methyl, ethyl and butyl and aryl radicals such as phenyl are preferably used.

These compounds include n-butyl phosphine, triphenyl phosphine and triethylphosphine oxide.

(l) Compounds of the formula $$PO_nX_3$$

wherein X is a halogen atom and $n$ is an integer from 0 to 1.

These compounds are phosphorus trichloride, phosphorus tribromide and phosphorus oxytrichloride.

(m) Compounds of the formula $$SO_nX_2$$

wherein X is a halogen atom, and $n$ is an integer from 1 to 2.

As these compounds there can be mentioned thionyl chloride, thionyl bromide, sulfuryl chloride and sulfuryl iodide.

(n) Compounds of the formula $$RSO_nX$$

wherein R is a $C_{1-12}$ hydrocarbon radical, X is a halogen atom, and $n$ is an integer from 1 to 2.

Of the foregoing compounds, those in which the hydrocarbon radical is an alkyl radical such as methyl and ethyl or an aryl radical such as phenyl are conveniently used.

Included are such compounds as ethane sulfonyl chloride, benzene sulfonyl chloride and benzene sulfinyl chloride.

(o) Compounds of the formula

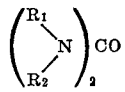

wherein $R_1$ and $R_2$ are each a hydrogen atom or a $C_{1-8}$ hydrocarbon radical.

These compounds include such as urea, 1,3-dimethylurea, tetramethylurea and tetraethylurea.

(p) Compounds of the formula

wherein $R_1$ and $R_2$ are each a $C_{1-12}$ hydrocarbon radical and $n$ is an integer from 1 to 2.

Of the foregoing compounds, those whose hydrocarbon radicals are alkyl radicals such as methyl and ethyl and aryl radicals such as phenyl are preferably used.

These compounds are exemplified by dimethyl sulfoxide, dimethyl sulfone and diphenyl sulfone.

(q) Compounds of the formula

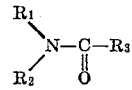

wherein $R_1$ and $R_2$ are each a hydrogen atom or a $C_{1-8}$ hydrocarbon radical, and $R_3$ is either a hydrogen atom or a $C_{1-12}$ hydrocarbon radical.

Of the foregoing compounds, those in which the hydrocarbon radicals of $R_1$ and $R_2$ are alkyl radicals such as methyl and ethyl or aryl radicals such as phenyl, and $R_3$ is an alkyl radical such as methyl and ethyl are to be preferred.

As examples of these compounds, dimethylacetamide, diphenylacetamide, dimethylformamide, di-n-butyl formamide and diethylformamide can be named.

(r) Compounds of the formula

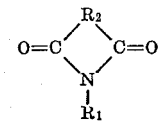

wherein $R_1$ is either a hydrogen atom or a $C_{1-8}$ hydrocarbon radical, and $R_2$ is a divalent $C_{2-12}$ hydrocarbon radical.

Of these compounds, those in which $R_1$ is an alkyl radical such as methyl or ethyl, $R_2$ is an alkylene radical such as ethylene, propylene, or an arylene radical such as phenylene are preferably used, examples being phthalamide, succinimide and N-methyl phthalamide.

(s) Compounds of the formula

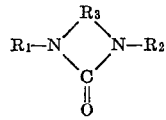

wherein $R_1$ and $R_2$ are each a hydrogen atom or a $C_{1-8}$ hydrocarbon radical, and $R_3$ is a divalent $C_{2-12}$ hydrocarbon radical.

Of the foregoing compounds, those in which $R_1$ and $R_2$ are alkyl radicals such as methyl or propyl and $R_3$ is an alkylene radical such as ethylene are conveniently used.

A typical example of these compounds is ethyleneurea.

(t) The salts of inorganic and organic acids which are formed with the compounds indicated by general formulas in (a), (b) and (c), above.

As the inorganic acids which form salts with the compounds shown by the general formulas in (a), (b) and (c), above, usable are hydrochloric, hydrobromic, phosphoric, sulfonic and silicic acids.

On the other hand, the organic acids which similarly form salts with the compounds shown by the general formulas in (a), (b) and (c), above, include the monobasic acids such as formic, acetic, propionic, valerianic, capronic, nonylic and benzoic acids and the dibasic acids such as malonic, oxalic, succinic, glutaric, adipic, 1,6-hexanedicarboxylic (=suberic), 1,8-octanedicarboxylic, phthalic, isophthalic and terephthalic acid.

Further, said organic acids may have alkyl radicals or halogen atoms in their hydrocarbon.

According to this invention, all of said salts which are formed by the variable combinations of the foregoing acids and the compounds indicated by said formulas in (a), (b) and (c), above, can be used.

Typical examples include the hydrochloric acid salt of triethylamine, the benzoic acid salt of triethylamine, hydrochloric acid salt of cyclohexylamine and the sulfonic acid salt of pyridine.

According to the invention method, one or more of the third ingredient compounds selected from the group consisting of the foregoing compounds can be used.

The ratio in which the ingredient compounds of the catalyst are mixed is such that the mol ratio of the first ingredient compound to the second ingredient compound is from 1:0.01 to 1:10, and preferably 1:0.1 to 1:5, whereas the mol ratio of the first ingredient compound to the third ingredient compound is from 1:0.005 to 1:20, and preferably 1:0.05 to 1:3.

The alpha-olefin polymerizing method of this invention can be carried out while using the unreacted monomers in place of the solvent. The invention method is however usually carried out using an inactive solvent. The term "inactive solvent" means that it is a solvent which does not substantially react under reaction conditions with the catalyst, alpha-olefins and other material that are present in the polymerization reaction system.

Conveniently used as said inactive solvents are the non-polymerizable hydrocarbons and chlorinated hydrocarbon type solvents.

Typical examples of the foregoing inactive solvents include the saturated aliphatic hydrocarbons such as pentane, hexane, heptane, octane and decane, the saturated alicyclic hydrocarbons such as cyclohexane, methylcyclohexane and decahydronaphthalene, the aromatic hydrocarbons such as benzene, toluene, xylene, ethylbenzene and tetrahydronaphthalene, and the chlorinated aromatic hydrocarbons such as chlorobenzene, 1,2-dichlorobenzene and 2-chloronaphthalene. Further, the mixtures of hydrocarbons such as kerosene, petroleum, benzine, ligroin and petroleum ether are also suitable solvents.

The foregoing solvents to be used in the invention method must be in a dehydrated and refined state by being treated in customary manner.

These solvents are used in the invention method in an amount of below 5000 grams, and preferably from 100 to 2500 grams, per gram of the first ingredient compound, the transition metal compound.

The polymerization reaction may be carried out by either the continuous or batchwise method. When using the continuous polymerization method, it is best to introduce the catalyst ingredients to the reactor successively in proportional quantities for ensuring the formation of polymer having uniform properties.

The method of polymerization in the present invention is carried out at a temperature ranging between —60° C. and 150° C., and preferably between 30° C. and 80° C.

On the other hand, the polymerization pressure used is from 0 to 50 kg./cm.² gauge, and preferably 1 to 15 kg./cm.² gauge.

The alpha-olefins, the starting material in this invention, are alpha-olefins of 2 to 12 carbon atoms. Typical examples of these alpha-olefins are the straight-chain alpha-olefins such as ethylene, propylene, butene-1, pentene-1 and decene-1, the branched alpha-olefins such as 3-methyl butene-1, 4-methyl pentene-1 and 4-methyl hexene-1, and the alpha-olefins having cyclic hydrocarbon radicals such as allyl-benzene, styrene, alpha-methyl-styrene and vinyl cyclohexene.

The average molecular weight of the resulting polymer can be controlled by causing hydrogen to be present in the polymerization reaction system along with the reactants.

When the desired degree of polymerization has been achieved, the catalyst is inactivated by a catalyst inactivating agent such as methanol in accordance with customary procedures as are employed in the olefin polymerization method which uses the known organometallic catalysts. The polymer is then thoroughly washed and vacuum dried.

The second ingredient compounds of the catalyst in this invention, i.e. the bisdialkylaluminum oxypropane-1,3 and bisdialkylaluminum oxybutane-1,3 of Formula I, are novel compounds that were obtained by us. It is prepared by the following process and has the hereinafter described characteristics.

1,3-propanediol or 1,3-butanediol is added in small increments with thorough stirring to a trialkylaluminum of the formula

wherein R is a lower alkyl radical of 1–4 carbon atoms, each of which may be the same or different. After addition of the 1,3-propanediol or 1,3-butanediol, the solvent is distilled off under reduced pressure. Thus, a bis(dialkylaluminumoxy)propane-1,3 is obtained when 1,3-propanediol has been used, whereas a bis(alkylaluminumoxy)butane-1,3 is obtained when 1,3-butanediol has been used. The reaction is as follows:

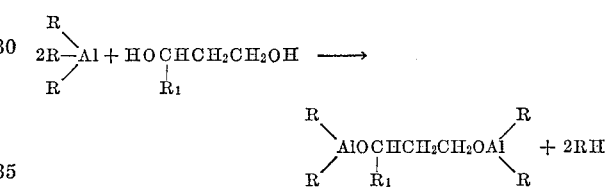

wherein R is as hereinabove defined and $R_1$ is either a hydrogen atom or methyl radical.

Specific examples of the trialkylaluminum include compounds such as trimethylaluminum, triethylaluminum and triisobutylaluminum.

The mixture of trialkylaluminum compounds having differing alkyl radicals also may be used in the said process.

While it is possible to carry out the foregoing process without using a solvent, it is desirable to use a solvent for accomplishing the thorough stirring of the reaction mixture and for removing the reaction heat from the reaction system. Inactive solvents are used in the said process. The term "inactive solvents" as here used is meant to be those solvents which do not react with the reactants of the reaction system nor the resulting reaction product.

Specific examples of these solvents include the aliphatic hydrocarbons such as heptane and octane, the alicyclic hydrocarbons such as methylcyclohexane and cyclohexane, the aromatic hydrocarbons such as benzene, toluene, xylene and tetraline, the chlorinated hydrocarbons such as chlorobenzene and dichloroethane, ethers such as diethyl ether, the amine compounds such as triethylamine, and the heterocyclic compounds containing a nitrogen atom, such as pyridine and piperidine.

The foregoing solvents must be in dehydrated and refined state by being treated by procedures known in the art.

The mol ratio of the trialkylaluminum to the 1,3-propanediol or 1,3-butanediol is preferably 2:1. The diol may be used somewhat in excess of this mol ratio. However, the molar quantity of the trialkylaluminum must be at least one mol per mol of the diol. If not, the results are undesirable, since the product obtained is either non-homogeneous or is hardened in gel fashion. Furthermore, a pronounced drop occurs in the yield.

A reaction temperature of —30° C. to 100° C., and preferably —10° C. to 60° C., is used.

Strict observance of the procedure of adding the reactants is required. Further, when the aforesaid diol is being added to the trialkylaluminum solution in small increments, the solution must be promptly stirred. A sequence of addition of the reactants which is reverse of that described is not desirable.

When the sequence of addition of the components is carried out precisely, it is believed that the

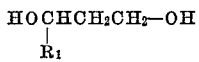

immediately reacts with the excess $(R)_3Al$ to form

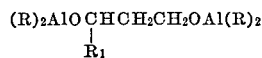

On the other hand, in the case the sequence of addition of the components is reversed or an excess of diol as compared with the trialkylaluminum is used or the reactants are mixed ith insufficient stirring, a homogeneous product cannot be obtained. For example, undesirable products such as shown below are formed.

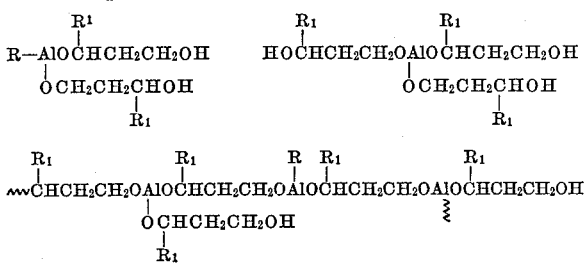

When such undesirable products as shown hereinabove are formed, these products do not dissolve in the solvent but precipitate.

The product which is obtained as hereinbefore described can be proven to be bis(dialkylaluminumoxy)alkane by means of its molecular weight measurement, analysis of evolved gas by gas chromatography and infrared absorption spectrum. Further, it was proved there was also instances of association of the molecules.

This bis(dialkylaluminumoxy)alkane is a viscous liquid at room temperature. Again, it does not fume or is not ignitable in air, its decomposition is slow, and it does not corrode metals. Hence, it is very easily handled.

It also has the advantage that its decomposition speed is less than the known organic aluminum compounds.

Further, when this bis(dialkylaluminumoxy)alkane is used as a polymerization catalyst, in view of the fact that its molecular weight is greater than the known organoaluminum compounds and that it contains at least two oxygen atoms in its molecule, it demonstrates a greater adsorbability to the transition metal compounds, the first ingredient compound of the catalyst of this invention and, even in small amounts, a pronounced polymerization catalytic activity.

The following nonlimitative examples are given for further illustrating this invention.

EXAMPLE 1

Propylene was polymerized in the presence of titanium trichloride and bisdiethylaluminumoxypropane-1,3. The polymerization was carried out inside a bottle (internal capacity: 633 cc.). At first a bottle whose inside was clean was heated and dried, thereafter the internal atmosphere was substituted by nitrogen, 250 cc. of heptane and about 2 mmols of titanium trichloride were charged in said bottle and the bottle was stopped. The atmosphere inside the bottle was substituted by propylene. Thereafter a predetermined amount of bis(diethylaluminumoxy)propane-1,3 was charged in the bottle, further, propylene was charged into the bottle at room temperature until the pressure inside the bottle became 3.0 atmospheres. The polymerization was carried out at 60° C. for 2 hours. The pressure inside the bottle was measured at the polymerization temperature, thereafter about 200 cc. of methanol was added to decompose the catalyst. After washing a white solid polymer with methanol sufficiently, the polymer was dried in vacuo at 50° C. for 24 hours. As physical properties of the polymer boiling n-heptane extraction residue (percent) (hereinafter referred to as I.I.) and viscosity were measured.

The results were shown in the following Table 1.

TABLE 1

| Example No. | $TiCl_3(AA)$ (g.) | DAT (mmol) | Final P (at 60° C.) (atom) | Yield of a solid polymer (g.) | I.I. (percent) | Viscosity ($\eta SP/C$) |
|---|---|---|---|---|---|---|
| 1 | 0.4148 | 0.1 | 0.90 | 22.72 | 89.82 | 7.93 |
| 2 | 0.4163 | 0.2 | −0.53 | 27.64 | 73.83 | 5.71 |
| 3 | 0.4178 | 0.3 | −0.53 | 28.22 | 67.04 | 4.34 |
| 4 | 0.4179 | 0.4 | −0.20 | 26.24 | 59.43 | 3.71 |
| 5 | 0.4179 | 0.5 | −0.53 | 27.24 | 51.24 | 2.94 |
| 6 | 0.4183 | 1.0 | −0.53 | 27.22 | 46.04 | 2.24 |
| 7 | 0.4187 | 1.2 | −0.53 | 26.21 | 45.15 | 2.10 |
| 8 | 0.4197 | 2.0 | −0.59 | 26.72 | 48.40 | 1.71 |

NOTES:
$TiCl_3(AA)$ was what activated titanium chloride obtained by reducing titanium tetrachloride with metallic aluminum.
DAT showed bis(diethylaluminumoxy)propane-1,3.
P stands for gauge pressure, in the following examples also.
Viscosity $\eta SP/C$ showed a value measured at a concentration of 0.04 g. polymer/100 cc. at 135° C. in tetralin.

EXAMPLE 2

Propylene was polymerized in the presence of titanium trichloride and bis(diethylaluminumoxy)propane - 1,3 while introducing hydrogen into the reaction system. The polymerization period was 3 hours, while other conditions were same as in Example 1. The results were shown in the following Table 2.

TABLE 2

| Example No. | $TiCl_3$ (AA) (g.) | DAT (mmol) | $H^2$(cc. 30° C.) | Final P (60° C.) (atom) | Yield of solid polymer (g.) | I.I. (percent) | Viscosity ($\eta SP/C$) |
|---|---|---|---|---|---|---|---|
| 1 | 0.3844 | 0.5 | 90 | −0.49 | 29.96 | 69.6 | 1.17 |
| 2 | 0.3857 | 1.0 | 30 | −0.53 | 29.05 | 44.5 | 1.82 |
| 3 | 0.3847 | 1.0 | 90 | −0.40 | 29.03 | 48.3 | 1.31 |
| 4 | 0.3850 | 2.0 | 90 | −0.17 | 27.05 | 54.4 | 1.19 |

EXAMPLE 3

Propylene was polymerized in the presence of a compound of a metal of Groups IV–B and V–B of the Periodic Table and bis(diethylaluminumoxy)propane-1,3. The polymerization period was 17 hours, while other conditions were same as in Example 1. The results were shown in the following Table 3.

TABLE 3

| Example No. | Transition metal comp. Formula | mmol | DAT (mmol) | Final P (60° C.) (atom) | Yield of solid polymer (g.) | I.I. (percent) | Viscosity ($\eta$SP/C) |
|---|---|---|---|---|---|---|---|
| 1 | TiCl₄ | 2 | 2 | −0.53 | 29.49 | 20.61 | 1.15 |
| 2 | VCl₃ | 4.24 | 5 | −0.53 | 31.47 | 55.51 | 3.44 |
| 3 | VOCl₃ | 5 | 5 | −0.07 | 25.43 | 40.15 | 2.71 |
| 4 | ZrCl₄ | 4.72 | 5 | 3.50 | 3.71 | 46.83 | 3.92 |
| 5 | TiCl₃(H) | 5.02 | 5 | −0.53 | 32.99 | 66.58 | 2.88 |

NOTE.—TiCl₃(H) showed titanium trichloride obtained by reducing titanium tetrachloride with hydrogen.

EXAMPLE 4

In the presence of titanium trichloride and bis(diethylalumiumoxy)propane-1,3, 3-methylbutene-1 and 4-methyl pentene-1 were polymerized. The experimental method was roughly same as in Example 1. Titanium trichloride and 250 cc. of heptane were charged into the bottle, there after 50 cc. of a monomer was poured, further, bis(diethylaluminumoxy)propane-1,3 was added. The polymerization was carried out at 60° C. for 17 hours, and the polymer was treated same as in Example 1. The results were shown in the following Table 4.

TABLE 4

| Ex. No. | TiCl³(AA) (g.) | DAT (mmol) | Added monomer (50 cc.) | Yield of solid polymer (g.) | I.I. (percent) | Viscosity ($\eta$SP/C) |
|---|---|---|---|---|---|---|
| 1 | 1.0042 | 2.5 | 3-methylbutene-1 | 36.45 | 95.75 | |
| 2 | 1.0045 | 2.5 | 4-methylpentene-1 | 31.03 | 33.63 | 1.63 |

EXAMPLE 5

A four-necked flask of a 500 cc. capacity having a stirrer, a thermometer, a gas inlet and a gas outlet, was charged with 300 cc. of purified heptane in the presence of nitrogen. The reactor was cooled to 0° C., into which reactor through the gas inlet ethylene was blown in at a ratio of 500 cc./min. and propylene at a ratio of 1500 cc./min. In about 10 minutes, ethylene and propylene were saturated, thereafter, when 2 mmols of bis(diethylaluminumoxy)propane-1,3 and 0.3 mmol of vanadium tetrachloride were poured into said flask by a syringe, the solution was colored in reddish purple and suddenly absorbed a monomer gas. The solution was homogeneous and in 60 minutes, viscosity of the solution became very high. The catalyst was inactivated by 10 cc. of methanol. The product was washed well with methanol, to the washed product an antioxidant was added and dried for 24 hours, and 14.0 g. of a rubbery copolymer was obtained. This copolymer showed [$\eta$]=3.00 (Tetraline, 135° C.), containing 56.5 mol percent of propylene monomer unit.

EXAMPLE 6

Same as in Example 3, using 300 cc. of heptane as a solvent, in the presence of a catalyst system consisting of 2 mmols of bis(diethylaluminumoxy)propane-1,3 and 0.3 mmol of vanadiumoxy trichloride, ethylene and propylene were copolymerized for 30 minutes. As a result 3.5 g. of rubbery copolymer was obtained, which contained 44.5 mol percent of porpylene monomer unit.

EXAMPLE 7

Using a reactor same as that in Example 5, 300 cc. of purified heptane was introduced thereinto. The reactor was cooled to 0° C., thereafter, into this reactor ethylene and propylene at the ratios same as in Example 5 were blown and saturated. Next, the reactor was charged with 5 ml. of 1,4-hexadiene, followed by 1 mmol of bis(diethylaluminumoxy)propane-1,3 and 0.3 mmol of vanadium tetrachloride by a syringe to initiate a polymerization reaction. After lapse of 60 minutes, by 10 cc. of methanol the catalyst was inactivated and by carrying out treatment same as in Example 1, 5.7 g. of rubbery copolymer was obtained. This copolymer showed [$\eta$]=2.86 (Tetralin, 135° C.) and iodine value of 11.65, containing 44 mol percent of propylene monomer unit.

EXAMPLE 8

In the presence of a catalyst system consisting of titanium trichloride and bis(diethylaluminumoxy)propane-1,3, hydrogen was introduced into a reactor and propylene was polymerized. Experiments Nos. 1, 2 and 3 showed results of polymerization carried out same as in Example 2 except using respective amounts of bis(diethylaluminumoxy)propane-1,3. Experiment No. 4 showed results of polymerization carried out as above except using as a third ingredient phosphorus trichloride besides said catalyst. Experiment No. 5 showed results of polymerization carried out as above except using as a third ingredient hexethylmelamine besides said catalyst. These results were shown in the following Table 5.

TABLE 5

| Ex. No. | TiCl₃(AA) (g.) | Et₂AlO-(CH₂)₂-OAlEt₂ (mmol) | A third ingredient mmol | A third ingredient Formula | H₂ (cc. at 30° C.) | Final P (60° C.) (atom) | Polymer yield (g.) | n-Heptane extraction residue (percent) | Viscosity ($\eta$ SP/C) |
|---|---|---|---|---|---|---|---|---|---|
| 1 | 0.3844 | 0.5 | 0 | | 90 | −0.49 | 29.96 | 69.6 | 1.167 |
| 2 | 0.3847 | 1.0 | 0 | | 90 | −0.40 | 29.03 | 48.3 | 1.314 |
| 3 | 0.3850 | 2.0 | 0 | | 90 | −0.17 | 27.05 | 54.4 | 1.190 |
| 4 | 0.3850 | 1.0 | 0.2 | PCl₃ | 90 | −0.08 | 28.80 | 89.16 | 1.610 |
| 5 | 0.3854 | 1.0 | 0.2 | Hexaethyl melamine | 90 | −0.42 | 29.89 | 71.57 | 1.853 |

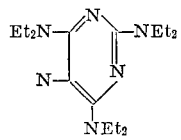

EXAMPLE 9

In the presence of a catalyst system consisting of titanium trichloride and bis(diethylaluminumoxy)propane-1,3, hydrogen was introduced into a reactor and propylene was polymerized. Experiments Nos. 1, 2 and 3 showed results of polymerization carried out same as in Example 2 except varying an amount of hydrogen. Experiment 4 showed results of polymerization carried out as above except adding as a third ingredient thionyl chloride besides said catalyst. Experiment 5 showed results of polymerization carried out as above except adding as a third ingredient tetrakis(dimethylamino)silane besides said catalyst. The results were shown in Table 6.

pane-1,3, various third ingredients, propylene was polymerized. The experimental operations are almost same as in Example 1. Namely, heptane: 250 cc., a bottle: 633 cc., initial pressure of propylene: 3.0 atmospheres, polymerization temperature: 60° C., polymerization period: 2 hours, $TiCl_3(AA)$: 2 mmols, and DAT: 0.3 mmol.

The results were shown in the following Table 7.

TABLE 6

| Ex. No. | $TiCl_3(AA)$ (g.) | $Et_2AlO(CH_2)_3OAlEt_2$ (mmol) | A third ingredient | | $H_2$ (cc. at 30° C.) | Final P (at 60° C.) (atom) | Polymer yield (g.) | n-Heptane extraction residue | Viscosity ($\eta SP/C$) |
|---|---|---|---|---|---|---|---|---|---|
| | | | mmol | Formula | | | | | |
| 1 | 0.3857 | 1.0 | 0 | | 30 | −0.53 | 29.05 | 44.54 | 1.815 |
| 3 | 0.3865 | 1.0 | 0 | | 120 | −0.42 | 30.79 | 55.66 | 1.158 |
| 4 | 0.3866 | 1.0 | 0.2 | $SOCl_2$ | 90 | −0.26 | 25.06 | 87.61 | 1.515 |
| 5 | 0.3870 | 1.0 | 0.2 | Tetrakis dimethyl amino silane $[(CH_3)_2N]_4Si$ | 90 | −0.34 | 27.77 | 82.01 | 1.737 |

EXAMPLE 10

In the presence of a catalyst system obtained by adding to titanium trichloride and bis(diethylaluminumoxy)pro-

TABLE 7

| Ex. No. | $TiCl_3(AA)$ (g.) | DAT (mmol) | A third ingredient | | | Final P (60° C.) (atom) | Yield of solid polymer (g.) | n-Heptane extraction residue (percent) |
|---|---|---|---|---|---|---|---|---|
| | | | mmol | Substance | Formula | | | |
| 1 | 0.4000 | 0.3 | 0.1 | Bornyl amine | (structure with $-NH_2$) | −0.49 | 30.66 | 67.76 |
| 2 | 0.4009 | 0.3 | 0.1 | Quinoxaline | (structure) | 1.95 | 21.14 | 84.40 |
| 3 | 0.4025 | 0.3 | 0.2 | Cyclohexyl amine hydrochloride | $NH_2 \cdot HCl$ (structure) | 4.35 | 6.75 | 89.76 |
| 4 | 0.4028 | 0.3 | 0.2 | Cyclohexyl amine benzoate | $NH_2 \cdot HOOC$ (structure) | 1.90 | 20.60 | 70.24 |
| 5 | 0.4057 | 0.3 | 0.1 | Ethylene urea | $HN\begin{smallmatrix}CH_2-CH_2\\ \\C\\\|\\O\end{smallmatrix}NH$ | −0.46 | 29.82 | 68.77 |
| 6 | 0.4187 | 0.3 | 0.1 | Benzenesulfonyl chloride | (structure)$-SO_2Cl$ | 0 | 27.34 | 65.93 |
| 7 | 0.4258 | 0.3 | 0.1 | n-Butyl formamide | $(n-C_4H_9)_2N \cdot CHO$ | 3.80 | 7.70 | 87.90 |
| 8 | 0.3802 | 0.3 | 0.1 | 2,6-dimethyl pyridine | (structure with $CH_3$ groups) | 0.35 | 26.94 | 77.99 |
| 9 | 0.3803 | 0.3 | 0.1 | Phthalimide | (structure with $O=C$, $C=O$, $NH$) | 3.05 | 13.82 | 56.69 |
| 10 | 0.3806 | 0.3 | 0.1 | Diethylformamide | $(C_2H_5)_2N \cdot CHO$ | 1.00 | 24.86 | 82.86 |
| 11 | 0.3825 | 0.3 | 0.1 | Ethane sulfonyl chloride | $C_2H_5SO_2Cl$ | 1.00 | 26.50 | 77.4 |
| 12 | 0.3827 | 0.3 | 0.1 | Dimethyl formamide | $(CH_3)_2N \cdot CHO$ | 0.70 | 25.27 | 79.44 |

TABLE 7—Continued

| Ex. No. | TiCl₃(AA) (g.) | DAT (mmol) | A third ingredient | | | Final P (60° C.) (atom) | Yield of solid polymer (g.) | n-Heptane extraction residue (percent) |
|---|---|---|---|---|---|---|---|---|
| | | | mmol | Substance | Formula | | | |
| 13 | 0.3835 | 0.3 | 0.1 | Hexakis(diethylamino)cyclotriphosphoazatriene-1,3,5. | (structure) | −0.12 | 28.31 | 81.64 |
| 14 | 0.3841 | 0.3 | 0.1 | Dimethylaceto amide | $CH_3CON(CH_3)_2$ | 1.10 | 24.26 | 84.60 |
| 15 | 0.4020 | 0.3 | 0.1 | 2-diethylamino-4,6-dichloro-S-triazine. | (structure) | −0.46 | 30.97 | 79.64 |
| 16 | 0.4044 | 0.3 | 0.1 | Triethylphosphate | $(C_2H_5O)_3PO$ | −0.55 | 31.01 | 71.54 |
| 17 | 0.4091 | 0.3 | 0.1 | Tri-n-butylphosphine | $(C_4H_9)_3P$ | 1.60 | 22.58 | 79.03 |

EXAMPLE 11

In the presence of a catalyst system consisting of titanium trichloride and bis(diethylaluminumoxy)butane-1,3 or a catalyst system consisting of titanium trichloride, bis(diethylaluminumoxy)butane-1,3 and phosphorus trichloride, propylene was polymerized. Bis(diethylaluminumoxy)butane-1,3 was obtained by reacting 2 mols of triethylaluminum and 1 mol of butanediol-1,3.

At first a bottle (internal capacity: 633 ml.) whose inside was clean was heated and dried, thereafter the internal atmosphere was substituted by nitrogen, said bottle was charged with 250 cc. of heptane and about 2 mmols of titanium trichloride, thereafter stopped. The internal atmosphere of the bottle was substituted by propylene. Thereafter, the bottle was further charged with a predetermined amount of bis(diethylaluminumoxy)butane-1,3 alone or together with a predetermined amount of phosphorus trichloride and propylene was further charged thereinto at room temperature until the atmosphere inside the bottle became 3.0 atmospheres. The polymerization was carried out at 60° C. for 2 hours. At the polymerization temperature, the pressure inside the bottle was measured and by about 200 cc. of methanol added to the bottle the catalyst was decomposed. The obtained white solid polymer was well washed with methanol, thereafter dried at 50° C. in vacuo for 24 hours. As the physical properties of the polymer, I.I., viscosity and bulk density were measured. The results were shown in Table 8.

As will be apparent from Table 8, when DAB was used as a first ingredient of the catalyst, polymerization activity of the catalyst became remarkably large until molar ratio of DAB to that of a second ingredient of titanium trichloride became small. Further, when the polymerization was carried out by adding PCl₃ to these catalyst systems, a highly crystalline, remarkably stereospecific polypropylene was obtained. Moreover, the catalyst added with PCl₃ showed a satisfactory polymerization activity.

EXAMPLE 12

In the presence of catalysts obtained by adding to titanium trichloride DAB and various compounds as third ingredients, propylene was polymerized. The experimental operations were almost same as in Example 11. The third ingredient substances were used as heptane solutions. The third ingredient substances not dissolved in heptane were passed through a sieve of 100 mesh and what passed the sieve was used as a heptane dispersion. At the time of using, while said bottle was being violently shaken to disperse said third ingredient substances, a required amount was rapidly taken out by a syringe and it was poured into the polymerization reactor.

The results of measuring physical properties of the so polymerized polymers obtained are shown in Table 9.

[Note]

(1) TiCl₃(AA) showed titanium trichloride obtained by reducing TiCl₄ with metallic aluminum and activating the same.

TABLE 8

| Example No. | TiCl₃(AA) (g.) | DAB (mmol) | PCl₃ (mmol) | Final P (60° C.) (atom) | Yield of solid polymer (g.) | Polymerization activity α (g./g. hr. atm.) | I.I.* (percent) | Viscosity (ηSP/C) | Bulk density (g./cc.) |
|---|---|---|---|---|---|---|---|---|---|
| 1 | 0.3947 | 0.3 | 0.08 | −0.21 | 35.87 | 16.6 | 92.6 | 3.67 | 0.253 |
| 2 | 0.3958 | 0.3 | 0.10 | −0.26 | 35.09 | 16.3 | 92.6 | 6.95 | 0.241 |
| 3 | 0.3950 | 0.3 | 0.12 | −0.18 | 33.40 | 15.0 | 93.6 | 10.29 | 0.284 |
| 4 | 0.3943 | 0.3 | 0.15 | −0.05 | 36.10 | 14.9 | 96.5 | 9.59 | 0.276 |
| 5 | 0.3948 | 0.5 | 0.15 | −0.14 | 35.27 | 15.6 | 88.8 | 8.98 | 0.228 |
| 6 | 0.3951 | 0.5 | 0.18 | 0 | 34.39 | 14.0 | 93.0 | 10.20 | 0.252 |
| 7 | 0.3953 | 0.5 | 0.22 | 0.12 | 32.90 | 13.2 | 94.9 | 10.36 | 0.279 |
| 8 | 0.3957 | 0.5 | 0.25 | 0.40 | 33.32 | 12.3 | 95.2 | 11.90 | 0.277 |
| 9 | 0.3940 | 0.3 | 0 | −0.47 | 36.05 | 18.7 | 62.4 | 5.72 | 0.142 |
| 10 | 0.3939 | 0.5 | 0 | −0.66 | 36.41 | 21.4 | 52.5 | 5.65 | 0.123 |
| 11 | 0.3950 | 1.0 | 0 | −0.72 | 37.85 | 23.5 | 44.8 | 2.41 | 0.153 |

*n-Heptane extraction residue.

NOTES:
TiCl₃(AA) showed titanium trichloride obtained by reducing titanium tetrachloride with metallic aluminum and activating the same.
DAB showed bis(diethylaluminiumoxy)butane-1,3.
Polymerization activity α showed g. (polymer)/g. (TiCl₃) hr. atm. and a value calculated from the initial and final gauge pressures inside the bottle at 60° C.

(2) DAB showed bis(diethylaluminumoxy)butane-1,3.

(3) n-Heptane extraction residue (%) showed percent of residue not extracted when 3.00 g. of the polymer was refluxed in boiling n-heptane for 24 hours.

(4) Polymerization conditions were same as in Example 11.

wherein $\alpha$: G./g. hr. atm.
Pe: Average atmosphere, kg./cm.$^2$-abs.
G: Yield of a solid polymer, g.
g: Weight of TiCl$_3$(AA), g.
t: Polymerization period, hr.

TABLE 9

| Ex. No. | TiCl$_3$(AA) (g.) | DAB (mmol) | Additive mmol | Additive Name and formula | Final P (60° C.) (atom) | Yield of solid polymer (g.) | n-Heptane extraction residue (percent) |
|---|---|---|---|---|---|---|---|
| 1 | 0.4089 | 0.3 | 0 | Triethylamine | −0.57 | 35.20 | 64.7 |
| 2 | 0.4093 | 0.3 | 0.1 | | −0.55 | 35.94 | 65.1 |
| 3 | 0.4079 | 0.3 | 0.2 | (C$_2$H$_5$)$_3$N | −0.63 | 39.08 | 53.7 |
| 4 | 0.4071 | 0.3 | 0.4 | | 0.50 | 34.34 | 77.1 |
| 5 | 0.4073 | 0.3 | 0.1 | Methylamine | −0.58 | 36.69 | 70.3 |
| 6 | 0.4081 | 0.3 | 0.2 | | 5.42 | 3.13 | 95.8 |
| 7 | 0.4076 | 0.3 | 0.4 | (cyclohexyl)-NH$_2$ | 5.70 | 0.70 | ------ |
| 8 | 0.4080 | 0.3 | 0.1 | Triethylamine hydrochloride | −0.17 | 35.35 | 90.4 |
| 9 | 0.4076 | 0.3 | 0.2 | | 0.92 | 29.61 | 94.8 |
| 10 | 0.4085 | 0.3 | 0.4 | (C$_2$H$_5$)$_3$NHCl | 1.12 | 27.15 | 96.5 |
| 11 | 0.4082 | 0.3 | 0.1 | Cyclohexylamine hydrochloride | −0.53 | 36.21 | 70.5 |
| 12 | 0.4076 | 0.3 | 0.2 | | −0.07 | 34.38 | 70.5 |
| 13 | 0.4085 | 0.3 | 0.4 | (cyclohexyl)-NH$_2$HCl | −0.44 | 37.88 | 73.9 |
| 14 | 0.4092 | 0.3 | 0.1 | Cyclohexylamine benzoate | −0.53 | 34.91 | 66.8 |
| 15 | 0.4093 | 0.3 | 0.2 | | −0.67 | 37.23 | 65.2 |
| 16 | 0.4071 | 0.3 | 0.4 | (cyclohexyl)-NH$_2$HOOC-(phenyl) | 1.07 | 19.31 | 77.2 |
| 17 | 0.4136 | 0.3 | 0.1 | Pyridine | −0.40 | 36.64 | 72.49 |
| 18 | 0.4133 | 0.3 | 0.2 | | 1.65 | 29.20 | 77.81 |
| 19 | 0.4146 | 0.3 | 0.4 | | 4.40 | 10.08 | 82.3 |
| 20 | 0.4187 | 0.3 | 0.1 | Quinoxaline | 4.50 | 9.36 | 96.1 |
| 21 | 0.4139 | 0.3 | 0.2 | | 5.40 | 1.07 | ------ |
| 22 | 0.4140 | 0.3 | 0.4 | | 5.45 | 0.26 | ------ |
| 23 | 0.4135 | 0.3 | 0.1 | Hexamethyl melamine | 0.80 | 31.03 | 96.6 |
| 24 | 0.4135 | 0.3 | 0.2 | N(CH$_3$)$_2$ | 4.50 | 8.71 | 97.5 |
| 25 | 0.4136 | 0.3 | 0.4 | (CH$_3$)$_2$N-triazine-N(CH$_3$)$_2$ | 5.05 | 1.66 | ------ |
| 26 | 0.4142 | 0.3 | 0.1 | Hexaethylmelamine | −0.67 | 37.72 | 92.9 |
| 27 | 0.4189 | 0.3 | 0.2 | N(C$_2$H$_5$)$_2$ | −0.63 | 37.73 | 93.0 |
| 28 | 0.4140 | 0.3 | 0.4 | (C$_2$H$_5$)$_2$N-triazine-N(C$_2$H$_5$)$_2$ | −0.50 | 35.79 | 93.7 |

EXAMPLE 13

Polymerizations were carried out same as in Example 12. However, polymerization activity shown in the table was a value (g./g. hr. atm.) sought as follows.

$$\alpha = G/gPet$$

Average atmosphere Pe was defined as follows:

$$Pe = \frac{1}{t}\int_0^t P\,dt = \frac{Po - P}{\ln\frac{Po}{P}}$$

wherein

P: Pressure inside the bottle, kg./cm.$^2$-abs. at period $t$
Po: Initial propylene pressure, namely the pressure inside the bottle when $t=0$, kg./cm.$^2$-abs.

As will be apparent from the following Table 10, it was understood that by adding a third ingredient to the catalyst system consisting of a first component and a second ingredient, crystallinity of the obtained polymer was remarkably improved.

TABLE 10

| Example No. | TiCl₃(AA) (g.) | DAB (mmol) | A third ingredient Name and formula | mmol | Final P (60° C.) (atom) | Yield of solid polymer (g.) | Polymerization activity α (g./g. hr. atm.) | I.I. (percent) |
|---|---|---|---|---|---|---|---|---|
| 1 | 0.3857 | 0.3 | Phosphorusoxytrichloride | 0.1 | 0.10 | 36.41 | 9.75 | 83.95 |
| 2 | 0.3866 | 0.3 | | 0.2 | 1.40 | 29.54 | 5.69 | 92.79 |
| 3 | 0.3878 | 0.3 | | 0.4 | 5.80 | 2.87 | 0.35 | 94.11 |
| 4 | 0.3831 | 0.3 | Hexamethylphosphorictriamide | 0.1 | −0.47 | 37.20 | 12.58 | 83.49 |
| 5 | 0.3841 | 0.3 | | 0.2 | −0.07 | 36.37 | 9.99 | 81.67 |
| 6 | 0.3856 | 0.3 | [(CH₃)₂N]₃P=O | 0.4 | 2.70 | 22.62 | 3.69 | 85.12 |
| 7 | 0.4282 | 0.3 | Triphenylphosphine | 0.1 | −0.53 | 37.81 | 11.80 | 68.03 |
| 8 | 0.4284 | 0.3 | | 0.2 | −0.26 | 35.46 | 9.60 | 75.35 |
| 9 | 0.4287 | 0.3 | (C₆H₅)₃P | 0.4 | −0.46 | 37.06 | 11.10 | 71.55 |
| 10 | 0.4017 | 0.3 | Triphenylphosphite | 0.1 | −0.62 | 37.85 | 14.25 | 82.10 |
| 11 | 0.4003 | 0.3 | | 0.2 | −0.47 | 38.07 | 13.06 | 88.51 |
| 12 | 0.4014 | 0.3 | (C₆H₅O)₃P | 0.4 | 2.40 | 22.98 | 3.93 | 95.53 |
| 13 | 0.4035 | 0.3 | Triethylphosphate | 0.1 | −0.66 | 39.13 | 15.12 | 78.26 |
| 14 | 0.4017 | 0.3 | | 0.2 | −0.21 | 35.81 | 10.75 | 80.80 |
| 15 | 0.4044 | 0.3 | (C₂H₅O)₃P=O | 0.4 | 1.70 | 28.42 | 5.32 | 85.72 |
| 16 | 0.4204 | 0.3 | Tri-n-butylphosphine | 0.1 | −0.11 | 35.02 | 9.36 | 85.33 |
| 17 | 0.4219 | 0.3 | | 0.2 | 4.40 | 14.08 | 1.80 | 90.50 |
| 18 | 0.4223 | 0.3 | (n-C₄H₉)₃P | 0.4 | 5.30 | 4.71 | 0.56 | 96.38 |
| 19 | 0.4181 | 0.3 | Isoquinoline | 0.1 | −0.49 | 39.06 | 12.19 | 69.27 |
| 20 | 0.4185 | 0.3 | | 0.2 | −0.26 | 36.05 | 9.62 | 74.33 |
| 21 | 0.4195 | 0.3 | | 0.4 | 3.50 | 19.50 | 2.68 | 85.16 |
| 22 | 0.4195 | 0.3 | Indole | 0.1 | −0.55 | 38.48 | 12.46 | 72.03 |
| 23 | 0.4199 | 0.3 | | 0.2 | −0.37 | 37.38 | 10.89 | 77.18 |
| 24 | 0.4217 | 0.3 | | 0.4 | 0.80 | 33.45 | 7.29 | 85.66 |
| 25 | 0.4217 | 0.3 | N-ethyl piperidine | 0.1 | −0.53 | 38.74 | 12.27 | 75.53 |
| 26 | 0.4222 | 0.3 | | 0.2 | 0.50 | 34.82 | 7.50 | 80.63 |
| 27 | 0.4239 | 0.3 | | 0.4 | 5.30 | 5.41 | 0.63 | 91.93 |
| 28 | 0.4253 | 0.3 | Ethyleneimine | 0.1 | −0.40 | 35.29 | 13.36 | 74.03 |
| 29 | 0.4255 | 0.3 | | 0.2 | 0.10 | 35.08 | 8.39 | 80.57 |
| 30 | 0.4261 | 0.3 | | 0.4 | 4.60 | 12.45 | 1.53 | 86.62 |
| 31 | 0.3953 | 0.3 | Tetrakis(dimethylamino)silane | 0.1 | −0.28 | 38.16 | 11.10 | 88.65 |
| 32 | 0.3977 | 0.3 | | 0.2 | 0.00 | 36.06 | 9.37 | 90.67 |
| 33 | 0.3980 | 0.3 | [(CH₃)₂N]₄Si | 0.4 | 0.10 | 35.38 | 8.89 | 92.93 |
| 34 | 0.4173 | 0.3 | Hexamethylcyclotrisilazane | 0.1 | −0.66 | 39.69 | 14.09 | 69.28 |
| 35 | 0.4175 | 0.3 | | 0.2 | −0.53 | 38.37 | 12.40 | 73.12 |
| 36 | 0.4188 | 0.3 | | 0.4 | −0.40 | 37.79 | 11.29 | 78.04 |
| 37 | 0.4227 | 0.3 | Dimethylformamide | 0.1 | −0.40 | 35.79 | 10.81 | 78.00 |
| 38 | 0.4228 | 0.3 | | 0.2 | 3.10 | 20.89 | 3.04 | 90.46 |
| 39 | 0.4245 | 0.3 | (CH₃)₂NCHO | 0.4 | 5.50 | 2.30 | 0.64 | 94.09 |
| 40 | 0.4249 | 0.3 | Di-n-butylformamide | 0.1 | 5.50 | 3.18 | 0.37 | 92.64 |
| 41 | 0.4258 | 0.3 | (n-C₄H₉)₂NCHO | 0.2 | 5.70 | 1.06 | 0.12 | |
| 42 | 0.4271 | 0.3 | Dimethylacetamide | 0.1 | −0.49 | 37.15 | 11.68 | 75.23 |
| 43 | 0.4275 | 0.3 | | 0.2 | 0.75 | 33.38 | 6.87 | 83.67 |
| 44 | 0.4277 | 0.3 | (CH₃)₂NCCH₃ ‖ O | 0.4 | 4.45 | 10.01 | 1.26 | 93.97 |
| 45 | 0.4125 | 0.3 | Phthalimide | 0.1 | −0.46 | 39.24 | 12.34 | 55.82 |
| 46 | 0.4137 | 0.3 | | 0.2 | 0.20 | 35.96 | 8.65 | 47.17 |

TABLE 10—Continued

| Example No. | TiCl₃(AA) (g). | DAB (mmol) | A third ingredient Name and formula | mmol | Final P (60° C.) (atom) | Yield of solid polymer (g). | Polymerization activity α (g./g. hr. atm.) | I.I (percent) |
|---|---|---|---|---|---|---|---|---|
| 47 | 0.4157 | 0.3 | Ethylene urea | 0.1 | −0.66 | 39.81 | 14.19 | 53.92 |
| 48 | 0.4151 | 0.3 |  | 0.2 | −0.59 | 39.35 | 13.36 | 59.60 |
| 49 | 0.4154 | 0.3 |  | 0.4 | −0.53 | 38.53 | 12.51 | 62.24 |
| 50 | 0.4031 | 0.3 | 1,3-dimethylurea | 0.1 | −0.17 | 36.58 | 10.77 | 89.02 |
| 51 | 0.4016 | 0.3 |  | 0.2 | 3.81 | 12.66 | 1.85 | 94.65 |
| 52 | 0.4047 | 0.3 | (CH₃NH)₂CO | 0.4 | 4.40 | 9.28 | 1.27 | 94.33 |
| 53 | 0.4036 | 0.3 | Diphenylsulfone | 0.15 | 2.10 | 26.05 | 4.61 | 93.98 |
| 54 | 0.4033 | 0.3 |  | 0.4 | 4.65 | 9.05 | 1.22 | 97.78 |
| 55 | 0.4024 | 0.3 | 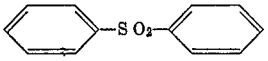 | 0.2 | 2.67 | 23.18 | 3.81 | 96.68 |
| 56 | 0.4279 | 0.3 | Benzenesulfonylchloride | 0.1 | 3.45 | 16.48 | 2.28 | 75.14 |
| 57 | 0.4282 | 0.3 |  | 0.2 | 6.00 | 1.24 |  |  |
| 58 | 0.3836 | 0.3 | Ethanesulfonylchloride | 0.1 | −0.03 | 35.98 | 9.78 | 75.64 |
| 59 | 0.3905 | 0.3 | C₂H₅SO₂Cl | 0.2 | 5.75 | 3.74 | 0.46 | 24.01 |

EXAMPLE 14

In the presence of a mixture of titanium trichloride and vanadium trichloride (transition metal compound component), and bis(diethylaluminumoxy)butane-1,3 or bis-(diethylaluminumoxy)propane - 1,3 (organoaluminum compound), 4-methylpentene-1 was polymerized.

A bottle whose inside atmosphere was substituted with nitrogen (internal capacity: 633 cc.) was charged with 200 cc. of heptane and a transition metal compound component and the bottle was stopped by a rubber packing, thereafter, 60 cc. of 4-methylpentene-1 was poured into the bottle, followed by removal of the nitrogen inside the bottle by a vacuum pump. Finally, to said bottle an organoaluminum compound was added.

The polymerization temperature was 60° C. and the polymerization period was 17 hours. After completion of the polymerization, about 200 cc. of methanol was added to the reaction mixture to decompose the catalyst and filter the obtained polymer, thereafter said polymer was washed with methanol and dried at 50° C. in vacuo for 24 hours. The results were shown in the following Table 11.

TABLE 11

| Ex. No. | Transition metal ingredient | | Organoaluminum ingredient | | 4-methylpentene-1 | | Conversion of a solid polymer (percent) | [η]³ | I.I. (percent) |
|---|---|---|---|---|---|---|---|---|---|
|  | TiCl₃(AA)¹ (g.) | VCl₃ (g.) | Substance² | mmol | Monomer (g.) | Solid polymer (g.) |  |  |  |
| 1 | 0.3905 | 0.9041 | DAB | 1 | 34.77 | 8.34 | 24.0 | 3.20 | 59.24 |
| 2 | 0.3908 | 0.9075 | DAT | 1 | 37.76 | 22.86 | 60.6 | 3.91 | 51.47 |
| 3 | 0.3913 | 0 | DAB | 1 | 37.45 | 10.29 | 27.4 | 3.66 | 55.93 |
| 4 | 0.3920 | 0 | {DAB, DAT} | {0.5, 0.5} | 37.50 | 14.20 | 37.9 | 3.82 | 54.55 |

¹ TiCl₃(AA) showed titanium trichloride obtained by reducing TiCl₄ with metallic aluminum and activating the same.
² DAB showed bis(diethylaluminiumoxy)butane-1,3, while DAT showed bis(diethylaluminiumoxy)propane-1,3.
³ [η] was a value measured in tetralin at 135° C.

EXAMPLE 15

Propylene was polymerized under conditions almost same as in Example 10 except adding to titanium trichloride and bis(diethylaluminumoxy)propane-1,3, as a third component a mixture of quinoxaline and cyclohexylamine hydrochloride or a mixture of triethyl phosphate and tri-n-butylphosphine. The results were shown in the following Table 12.

EXAMPLE 16

In a 300-cc. three-necked round-bottom flask having a nitrogen seal opening, a rotor was put whereby the inside atmosphere of the flask was substituted by nitrogen, thereafter in the flask 41.2 cc. (0.3 mol) of triethylaluminum was dissolved in 100 cc. of benzene. The reaction was carried out at room temperature. With sufficient stirring, 11.4 g. (0.15 mol) of trimethylene glycol was slowly poured dropwise into said round-bottom flask in 2 hours by a syringe. When trimethylene glycol was poured dropwise, it suddenly reacted with triethylaluminum, however, close to the end of dropping the reaction became slowly and generation of a gas also became very slowly. The generated amount of the gas was quantitative. After completion of dropping of said trimethylene glycol, the reaction mixture was heated to 60–80° C. for about 3 hours. After being cooled, from the reaction mixture, the solvent was distilled off at room temperature under a reduced pressure of 80 mm. Hg, further a vacuum distillation at 100–110° C. under a reduced pressure of 1–2 mm. Hg was effected, however, nothing was distilled off. The product was a white, opaque, viscous oily substance and upon contact with air, the product was rapidly decomposed without bringing about white smoke or ignition. When heptane was added to said product and heated the mixture, it became an opaque solution. When benzene was added to said solution, it became a transparent solution. The product was found to be easily soluble in benzene and became a transparent solution having a low viscosity.

TABLE 12

| Example No. | TiCl₃(AA) (g.) | DAT (mmol) | A third ingredient substance Substance | mmol | Final P (60° C.) (atom) | Yield of solid polymer (g.) | n-Heptane extraction residue (percent) |
|---|---|---|---|---|---|---|---|
| 1 | 0.4010 | 0.3 | {Quinoxaline, Cyclohexylamine hydrochloride} | {0.2, 0.2} | 2.37 | 20.58 | 86.36 |
| 2 | 0.4035 | 0.3 | {Triethylphosphate, Tri-n-butylphosphine} | {0.1, 0.1} | 1.53 | 26.71 | 77.34 |

The molecular weight and number of aluminum atoms contained in one molecule of the compound considered as bis(diethylaluminumoxy)propane-1,3 (DAT) synthesized as above were calculated by a cryoscopic.

As a result of measuring by titrating the aluminum content of DAT benzene solution using EDTA (ethylene diamine tetraacetic acid) and ferric chloride, it was found to be 1.94 mmols/cc.

Number of aluminum atoms contained in one molecule was sought as follows. At first, lowering of the melting point of a solution obtained by adding predetermined amount of DAT solution to a predetermined amount of benzene was measured and the mol number of DAT (g./M) was sought. The number was sought by dividing the aluminum content contained in said solution by g./M.

$$\frac{g}{M} = \Delta T \times \frac{G}{K}$$

wherein: $g$: weight of the sample, $M$: molecular weight, $G$: weight of benzene, $K$: 5120 (in case of benzene), $\Delta T$: lowering of the melting point.

The measured results were shown in Table 13.

As will be apparent from the table, number of aluminum atoms in one molecule was more than 2 and production of bis(diethylaluminumoxy)propane-1,3 was inferred.

Also the amount of a non-volatile substance contained in 0.921 cc. of DAT benzene solution (aluminum content: 1.94 mmols/cc.) was 0.254 g., accordingly, it was understood that the apparent molecular weight of DAT became 352.

aluminum n-heptane solution was cooled to —20° C. and 0.30 mol of ethylene glycol was gradually poured dropwise thereinto, the reactants intensely reacted while generating a gas quantitatively, and with the dropping, viscosity of the reaction system rose, separating precipitate. What was obtained was non-uniform. Even when said reaction was carried out at a temperature below —30° C. or viscosity was made one-half or the solvent was changed to benzene, no uniform solution could be obtained.

Control 2

Using hexamethylene glycol or tetramethylene glycol the reaction same as in Control 1 was carried out, however, in each case, the entire reaction system become non-uniform or solidified in a gelated state and it was not possible to obtain a uniform solution.

EXAMPLE 17

In a 300-cc. 3-necked round-bottom flask provided with an outlet for gas enerated and an insertion opening for a therometer, a rotor was placed and the atmosphere of the flask was sufficiently substituted by nitrogen. Said flask was charged with 200 cc. of heptane and 29.42 g. (0.256 mol) of triethyl aluminum were added. The reaction was carried out at 30° C. With sufficient stirring of the solution, 11.63 g. of 1,3-butanediol was slowly added to the solution in about 2.5 hours. With dropping of 1,3-butanediol, the reaction became violent. As completion of dropping approached, the reaction became slow. The apparent generated amount of a gas was 5.58

TABLE 13

| Ex. No. | DAT solution adding amount (cc.) | Benzene amount G (g.) | Lowering of the M.P. F | T | ΔT | Average value (T ΔT) | G./M. (=ΔT×G/K) (mol) | Aluminium content (mmol) | No. of Al atoms in one molecule |
|---|---|---|---|---|---|---|---|---|---|
| 1 | Non-addition. | 33.9 | 1 | 0.099 | | T=0.098 | | | |
| 2 | | | 2 | 0.098 | | | | | |
| 3 | | | 3 | 0.103 | | | | | |
| 4 | | | 4 | 0.095 | | | | | |
| 5 | | | 5 | 0.095 | | | | | |
| 6 | 0.921 | 34.4 | 1 | 0.207 | 0.109 | T=0.201 | 6.93 ×10⁻⁴ | 1.94 ×10⁻³ | 2.80 |
| 7 | | | 2 | 0.195 | 0.097 | ΔT=0.103 | | | |
| 8 | | | 3 | 0.202 | 0.104 | | | | |
| 9 | 2×0.921 | 35.0 | 1 | 0.307 | 0.209 | T=0.306 | 14.21 ×10⁻⁴ | 3.88 ×10⁻³ | 2.73 |
| 10 | | | 2 | 0.306 | 0.208 | ΔT=0.208 | | | |
| 11 | 3×0.921 | 35.5 | 1 | 0.420 | 0.304 | T=0.403 | 21.16 ×10⁻⁴ | 5.83 ×10⁻³ | 2.76 |
| 12 | | | 2 | 0.408 | 0.310 | ΔT=0.305 | | | |
| 13 | | | 3 | 0.398 | 0.300 | | | | |

Note:
Benzene amount (G) included benzene of DAT benzene solution.
F showed frequency.
Lowering of M.P. was measured by a Beckmann thermometer.

Figure 2:
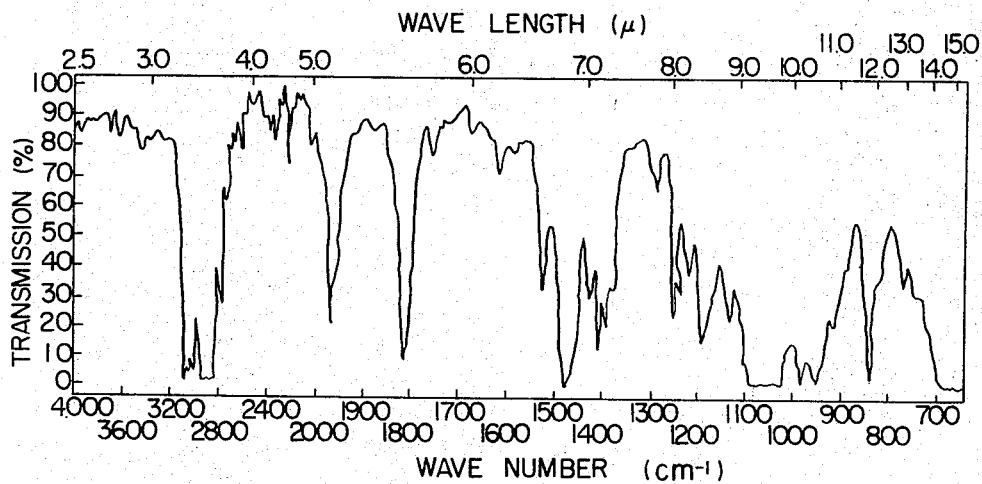

Next, an infrared absorption spectrum of DAT benzene solution was shown in FIGS. 1 and 2. With prism KBr and spencer 0.1 mm., benzene (FIG. 1) and DAT benzene solution (FIG. 2) were measured. As will be apparent from the spectra, at 3200–4000 cm.⁻¹ there is no absorption of OH and at 1000–1100 cm.⁻¹, there is a strong absorption similar to absorption of C—O—C bond.

Upon synthesizing DAT, gases generated at 1/3, 2/3 and 3/3 of the entire adding amount of trimethylene glycol were analyzed by a gas chromatograph and the following results were obtained.

TABLE 14

| Trimethyleneglycol (adding amt./entire amt.) | Ethane, percent | Propane, percent | iso-Butane | n-Butane |
|---|---|---|---|---|
| 1/3 | 99.40 | 0.22 | 0.04 | 0.34 |
| 2/3 | 98.89 | 0.21 | 0.06 | 0.84 |
| 3/3 | 98.28 | 0.26 | 0.05 | 1.41 |

From the above table it was understood that almost all of the gases generated quantitatively was ethane.

Control 1

Same as in Example 16, triethyl aluminum was reacted with ethylene glycol. When 600 cc. of 2 mols/l. triethyl liters and as a result of effecting amendment of vapor pressure and temperature, it was understood that OH of 1,3-butanediol generated quantitatively ethane gas. After completion of dropping, at 35–40° C. under a reduced pressure benzene was distilled off from the reaction mixture. The residue was distilled in vacuo under a pressure of 1–1.5 mm. Hg and a bath temperature of 160° C.– 180° C. A fraction distilled out at a temperature above 100° C. was about 30%. The distillate and the residue were both transparent solutions, when dissolved in heptane they became somewhat opaque and they were well dissolved in benzene, becoming transparent solutions. The product showed no fuming and igniting properties in air, but it was decomposed slowly. It was understood that when methanol was added to the product, the product was decomposed slowly, generating ethane gas.

Number of aluminum atoms contained in 1 molecule of the compound considered as bis(diethylaluminumoxy) butane-1,3 synthesized as above and molecular weight of said compound was sought. As the measuring method, a method of measuring freezing point depression using benzene as the solvent was adopted. Aluminum content contained in benzene solution of bis(diethylaluminumoxy)butane-1,3 was measured by using EDTA (ethylene diamine tetraacetic acid) and ferric chloride and decided. As a result, it was 1.83 gram atom/liter. The number of aluminum atoms contained in one molecule was sought as follows. At first a certain amount of sample of the residue solution was added to benzene solvent. By measuring the freezing point depression of the mixed solution, the mol number of bis(diethylaluminumoxy)butane-1,3 in the sample was sought. A value obtained by dividing the aluminum content contained in said sample of the residue solution by said mol number was the number of aluminum atoms contained in one molecule. The measuring was carried out under strict nitrogen sealing.

$$\frac{g}{M} = \Delta T \times \frac{G}{K}$$

wherein, $g$: weight of sample, $M$: molecular weight, $G$: weight of benzene; $K$: 5120 (in case of benzene) $\Delta T$: the freezing point depression.

The measured results were shown in the following Table 15.

As will be apparent from the table, the number of aluminum atoms contained in one molecule was about 3, by this fact production of bis(diethylaluminumoxy)butane-1,3 was supported.

From the molecular formula of bis(diethylaluminumoxy)butane-1,3, in one molecule 2 aluminum atoms are to be contained. However, it is generally recognized that an organoaluminum compound exists in an associated state. Accordingly, bis(diethylaluminumoxy)butane-1,3 also existed in an associated state, therefore, that number of aluminum atoms was not 2, but 3 was perhaps shown by said measuring method. Structure of the product was confirmed by infrared absorption spectrum.

tion in vacuo, number of aluminum atoms contained in the molecule of bis(diethylaluminumoxy)butane-1,3 and the molecular weights were measured and the following results were obtained. The measuring method was exactly same as that in Example 17.

TABLE 16

| Fraction | No. of aluminum in one molecule [Al]/(g./M.) | Aluminum content in the sample (cut percent) | Molecular weight |
|---|---|---|---|
| The initial distillate | 2.34 | 21.02 | 300 |
| The main distillate | 2.79 | 20.86 | 361 |
| The residue | 2.91 | 19.70 | 399 |

Note.—1. [Al] was aluminum (mol) contained in the samples added for measuring.
2. The molecular weight included apparent increase due to association.

As will be understood from the results shown in the table, the higher was the distilling temperature, the more increased number of aluminum atoms contained in one molecule. However, between the main distillate and the residue, numbers of aluminum atoms were not so different. In the initial distillate, the number was 2.34 and smaller. This was considered because in the initial distillate unreacted triethyl aluminum was contained. The aluminum contents in the sample were as shown in the following Table 17. When the (theoretical) aluminum contents of triethyl aluminum and bis(diethylaluminumoxy)butane-1,3 were compared, the aluminum content of triethyl aluminum was pretty high. In contrast, the value in the above Table 16 showed a value closer to the theoretical value of bis(diethylaluminumoxy)butane-1,3.

TABLE 15

| Amount of benzene G (g.) | DAT solution adding amount (cc.) | Freezing point (T) | | Average lowering amount | | Aluminium | | |
| | | F | Reading on Bukmann thermometer | T $\Delta T$ | Average value | g./M. (=$\Delta T \times G K$) (mol) | content (gram atom) | [Al]/(g./M.) |
|---|---|---|---|---|---|---|---|---|
| 37.36 | 0 | 1 | 0.677 | T | 0.677 | | | |
| | | 2 | 0.679 | | | | | |
| | | 3 | 0.675 | $\Delta T$ | | | | |
| 38.03 | 1 | 1 | 0.758 | T | 0.757 | 5.94 | 1.831 | 3.08 |
| | | 2 | (0.745) | | | $\times 10^{-4}$ | $\times 10^{-3}$ | |
| | | 3 | 0.755 | $\Delta T$ | 0.080 | | | |
| 38.70 | 2 | 1 | 0.843 | T | 0.841 | 12.40 | 3.662 | 2.96 |
| | | 2 | 0.840 | | | $\times 10^{-4}$ | $\times 10^{-3}$ | |
| | | 3 | 0.841 | $\Delta T$ | 0.164 | | | |
| 39.37 | 3 | 1 | 0.925 | T | 0.920 | 18.67 | 5.493 | 2.94 |
| | | 2 | 0.917 | | | $\times 10^{-4}$ | $\times 10^{-3}$ | |
| | | 3 | 0.918 | $\Delta T$ | 0.243 | | | |

NOTE.—The measured values in the above table were obtained by measuring benzene only and mixed solutions of benzene and 1 cc. each of the sample solution up to 3 cc.

EXAMPLE 18

Same as in Example 17, triethyl aluminum was reacted with 1,3-butanediol in benzene, in the reaction 25.8 g. of triethyl aluminum, 150 cc. of benzene, 10.24 g. of 1,3-butanediol, the reaction temperature of 35° C. and the reaction period of about 3 hours were employed. The apparent generated amount of a gas was 5.1 liters. The reaction liquid was distilled off at 35–40° C. under a reduced pressure and distilled in vacuo under a pressure of 1–1.5 mm. Hg and at a bath temperature of 150–170° C. As a result, 3.95 g. of the initial distillate, 7.96 g. of the main distillate and 15.87 g. of the residue were obtained (because the distilling speed was small, the distilling temperature could not be precisely known). Yields of the obtained bis(diethylaluminumoxy)butane-1,3 were roughly quantitative. It had no fuming and igniting properties and it was understood that it was slowly decomposed in air.

With reference to said initial distillate, main distillate and residue obtained as a result of carrying out distilla-

TABLE 17

| Organoaluminum compound | Aluminum content, percent | |
| | Theoretical value | Actual value |
|---|---|---|
| $(C_2H_5)_3Al$ | 23.66 | 23.49 |
| $(C_2H_5)_2Al-OCHCH_2CH_2OAl(C_2H_5)_2$<br>　　　　　　　　　$\mid$<br>　　　　　　　　$CH_3$ | 20.89 | 20.86 |

What we claim is:

1. A method of polymerizing alpha-olefins which comprises polymerizing alpha-olefins in the presence of a catalyst comprising
   (1) at least one first ingredient selected from the group consisting of the halides, oxyhalides, acetylacetonates, alcoholates, sulfonates, phosphates of transition metal of Groups IV-A, V-A and VI-A of the Periodic Table, and
   (2) at least one second ingredient selected from the bis(dialkylaluminumoxy)alkane compounds of the formula (I) 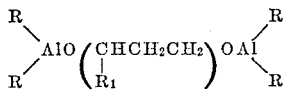

wherein R is a lower alkyl radical of 1 to 4 carbon atoms and $R_1$ is a member of the group consisting of a hydrogen atom and methyl radicals.

2. The method according to claim 1 wherein the polymerization temperature ranges between −60° C. and 150° C., the polymerization pressure ranges from 0 to 50 kilograms per square centimeter gauge, and the mol ratio of said first ingredient to said second ingredient ranges between 1:0.01 and 1:10.

3. The method according to claim 1 wherein the polymerization temperature ranges between 30° C. and 80° C., the polymerization pressure ranges from 1 to 15 kilograms per square centimeter gauge, and the mol ratio of said first ingredient to the second ingredient ranges between 1:0.1 and 1:5.

4. The method according to claim 1 wherein said bis-dialkylaluminum oxyalkane compound of Formula I, the second ingredient, is bisdiethylaluminum oxypropane-1,3.

5. The method according to claim 1 wherein said bis-dialkylaluminum oxyalkane compound of Formula I, the second ingredient, is bisdiethylaluminum oxybutane-1,3.

6. The method according to claim 1 which comprises using a solvent selected from the group consisting of non-polymerizable hydrocarbon and chlorinated hydrocarbon solvents in effecting the polymerization reaction of the alpha-olefins.

7. The method according to claim 1 wherein said alpha-olefins are alpha-olefins of 2 to 12 carbon atoms.

8. The method according to claim 1 wherein said compounds of transition metal of Groups IV-A, V-A and VI-A of the Periodic Table, the first ingredient, are compounds selected from the group consisting of the halides, oxyhalides, acetylacetonates, alcoholates, sulfonates and phosphates of titanium, vanadium and zirconium.

9. The method according to claim 8 wherein the titanium halide, the first ingredient, is titanium trichloride obtained by the reduction of titanium tetrachloride with hydrogen.

10. The method according to claim 8 wherein said titanium halide, the first ingredient, is titanium trichloride obtained by reducing titanium tetrachloride by metallic aluminum.

11. A method of polymerizing alpha-olefins which comprises polymerizing alpha-olefins in the presence of a catalyst comprising (1) at least one first ingredient selected from the group consisting of the halides, oxyhalides, acetylacetonates, alcoholates, sulfonates and phosphates of transition metal of Groups IV-A, V-A and VI-A of the Periodic Table;

(2) at least one second ingredient selected from the bis(dialkylaluminumoxy)alkane compound of the formula (I) 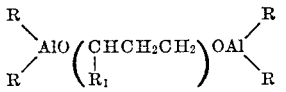

wherein R is a lower alkyl radical of 1 to 4 carbon atoms, and $R_1$ is a member of the group consisting of a hydrogen atom and methyl radical;

(3) at least one third ingredient selected from the following promoter compounds comprising organic or inorganic compounds containing nitrogen, phosphorus or sulfur atom;

(a) compounds of the formula

wherein $R_1$, $R_2$ and $R_3$ are each a member of the group consisting of a hydrogen atom and a $C_{1-12}$ hydrocarbon radical;

(b) compounds of the formula

wherein $R_1$ is a member of the group consisting of a hydrogen atom and a $C_{1-12}$ hydrocarbon radical, and $R_2$ is a divalent $C_{2-12}$ hydrocarbon radical;

(c) compounds of the formula

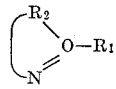

wherein $R_1$ is a member of the group consisting of a hydrogen atom and a $C_{1-8}$ hydrocarbon radical, and $R_2$ is a divalent $C_{5-18}$ hydrocarbon radical;

(d) alkyl diamines having a molecular weight not more than 400;

(e) aryldiamines having a molecular weight not more than 400;

(f) 6-membered heterocyclic compounds consisting solely of carbon, hydrogen and two nitrogen atoms in the molecular configuration, and having a molecular weight of not more than 400;

(g) the condensation of an aryl ring and a 6-membered heterocyclic compound consisting solely of carbon, hydrogen and two nitrogen atoms in the molecular configuration, and having a molecular weight of not more than 400;

(h) compounds of the formula

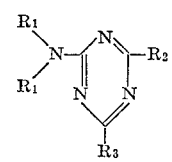

wherein $R_1$ is a member of the group consisting of a hydrogen atom and a $C_{1-8}$ hydrocarbon radical, and $R_2$ and $R_3$ are each a member selected from the group consisting of

a halogen atom and a hydrocarbon radical;

(i) compounds of the formulas

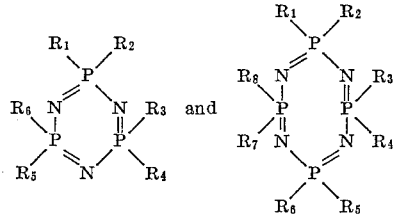

wherein $R_1$, $R_2$, $R_3$, $R_4$, $R_5$, $R_6$, $R_7$ and $R_8$ are each a member of the group consisting of the halogen atoms and $-N(R')_2$ of which R' is a member of the group consisting of a hydrogen atom and a $C_{1-8}$ hydrocarbon radical;

(j) compounds of the formula

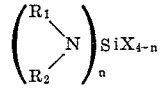

wherein $R_1$ is a member of a group consisting of a hydrogen atom and a $C_{1-8}$ hydrocarbon radical, $R_2$ is a $C_{1-8}$ hydrocarbon radical, X is a member of the group consisting of a $C_{1-12}$ hydrocarbon radical and a halogen atom, and $n$ is an integer from 1 to 4;

(k) compounds of the formula

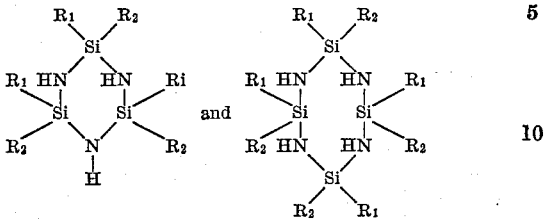

wherein $R_1$ and $R_2$ are each a $C_{1-8}$ hydrocarbon radical;

(l) compounds of the formula

wherein $R_1$ and $R_2$ are each a $C_{1-8}$ hydrocarbon radical;

(m) compounds of the formula $$(R_1O)(R_2O)(R_3O)P=O_n$$

wherein $R_1$, $R_2$ and $R_3$ are each a $C_{1-8}$ hydrocarbon radical and $n$ is an integer from 0 to 1;

(n) compounds of the formula $$R_1R_2R_3P=O_n$$

wherein $R_1$, $R_2$ and $R_3$ are each a member of the group consisting of a hydrogen atom and a $C_{1-8}$ hydrocarbon radical and $n$ is an integer from 0 to 1;

(o) compounds of the formula $$PO_nX_3$$

wherein $X$ is a halogen atom, and $n$ is an integer from 0 to 1;

(p) compounds of the formula $$SO_nX_2$$

wherein $X$ is a halogen atom, and $n$ is an integer from 1 to 2;

(q) compounds of the formula $$RSO_nX$$

wherein $R$ is a $C_{1-12}$ hydrocarbon radical, $X$ is a halogen atom, and $n$ is an integer from 1 to 2;

(r) compounds of the formula

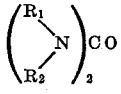

wherein $R_1$ and $R_2$ are each a member of the group consisting of a hydrogen atom and a $C_{1-8}$ hydrocarbon radical;

(s) compounds of the formula

wherein $R_1$ and $R_2$ are each a $C_{1-12}$ hydrocarbon radical and $n$ is an integer from 1 to 2;

(t) compounds of the formula

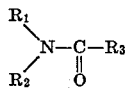

wherein $R_1$ and $R_2$ are each a member of the group consisting of a hydrogen atom and a $C_{1-8}$ hydrocarbon radical and $R_3$ is a member of the group consisting of a hydrogen atom and a $C_{1-12}$ hydrocarbon radical;

(u) compounds of the formula

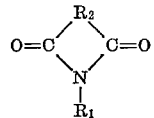

wherein $R_1$ is a member of the group consisting of a hydrogen atom and a $C_{1-8}$ hydrocarbon radical, and $R_2$ is a divalent $C_{5-18}$ hydrocarbon radical;

(v) compounds of the formula

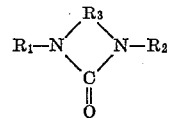

wherein $R_1$ and $R_2$ are each a member of the group consisting of a hydrogen atom and a $C_{1-8}$ hydrocarbon radical, and $R_3$ is a divalent $C_{2-12}$ hydrocarbon radical; and (w) the salts of inorganic and organic acids which are formed with the compounds indicated by the said general formulas in (a), (b) and (c), above.

12. The method according to claim 11 wherein the polymerization temperature ranges between −60° C. and 150° C., the polymerization pressure ranges from 0 to 50 kilograms per square centimeter gauge, and the mol ratio of said first ingredient to said second ingredient to said third ingredient ranges from 1:0.01:0.005 to 1:10:20.

13. The method according to claim 11 wherein the polymerization temperature ranges between 30° C. and 80° C., the polymerization pressure ranges from 1 to 15 kilograms per square centimeter gauge, and the mol ratio of said first ingredient to said second ingredient to said third ingredient ranges from 1:0.1:0.05 to 1:5:3.

14. The method according to claim 11 wherein said bisdialkylaluminum oxyalkane compound of Formula I, the second ingredient is bisdiethylaluminum oxypropane-1.3.

15. The method according to claim 11 wherein said bisdialkylaluminum oxyalkane compound of Formula I, the second ingredient, is bisdiethylaluminum oxybutane-1,3.

16. The method according to claim 11 wherein said alpha-olefins are alpha-olefins of 2 to 12 carbon atoms.

17. The method according to claim 11 which comprises using a solvent selected from the group consisting of non-polymerizable hydrocarbon and chlorinated hydrocarbon solvents in effecting the polymerization reaction of the alpha-olefins.

18. The method according to claim 11 wherein said compounds of transition metal of Groups IV-A, V-A and VI-A of the Periodic Table, the first ingredient, are compounds selected from the group consisting of the halides, oxyhalides, acetylacetonates, alcoholates, sulfonates and phosphates of titanium, vanadium and zirconium.

19. The method according to claim 18 wherein the titanium halide, the first ingredient, is titanium trichloride obtained by the reduction of titanium tetrachloride with hydrogen.

20. The method according to claim 18, wherein said titanium halide, the first ingredient, is titanium trichloride obtained by reducing titanium tetrachloride by metallic aluminum.

21. A polymerization catalyst for alpha-olefins, said catalyst comprising
(1) at least one first ingredient selected from the group consisting of the halides, oxyhalides, acetylacetonates, alcoholates, sulfonates, and phosphates of transition metal of Groups IV-A, V-A and VI-A of the Periodic Table; and (2) at least one second ingredient selected from the bis(dialkylaluminumoxy) alkane compound of the formula (I)

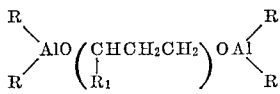

wherein R is a lower alkyl radical of 1 to 4 carbon atoms and $R_1$ is a member of the group consisting of a hydrogen atom and methyl radical.

22. A polymerization catalyst for alpha-olefins, said catalyst comprising
(1) at least one first ingredient selected from the group consisting of the halides, oxyhalides, acetylacetonates, alcoholates, sulfonates and phosphates of transition metal of Groups IV-A, V-A and VI-A of the Periodic Table;
(2) at least one second ingredient selected from the bis(dialkylaluminumoxy)alkane compound of the formula (I)

(I) 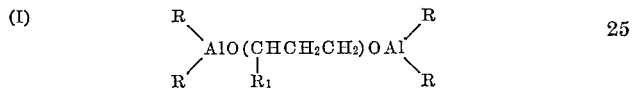

wherein R is a lower alkyl radical of 1 to 4 carbon atoms and $R_1$ is a member of the group consisting of a hydrogen atom and methyl radical;
(3) at least one third ingredient selected from the group consisting of the following promoter compounds containing a nitrogen, phosphorous or sulfur atom;
(a) compounds of the formula $$R_1R_2R_3N$$

wherein $R_1$, $R_2$ and $R_3$ are each a member of the group consisting of a hydrogen atom and a $C_{1-12}$ hydrocarbon radical;
(b) compounds of the formula

wherein $R_1$ is a member of the group consisting of a hydrogen atom and a $C_{1-12}$ hydrocarbon radical, and $R_2$ is a divalent $C_{2-12}$ hydrocarbon radical;
(c) compounds of the formula

wherein $R_1$ is a member of the group consisting of a hyddogen atom and a $C_{1-8}$ hydrocarbon radical, and $R_2$ is a divalent $C_{5-18}$ hydrocarbon radical;
(d) alkyl diamines having a molecular weight not more than 400;
(e) aryldiamines having a molecular weight not more than 400;
(f) 6-membered heterocyclic compounds consisting solely of carbon, hydrogen and two nitrogen atoms in the molecular configuration, and having a molecular weight of not more than 400;
(g) the condensation of an aryl ring and a 6-membered heterocyclic compound consisting solely of carbon, hydrogen and two nitrogen atoms in the molecular configuration, and having a molecular weight of not more than 400;
(h) compounds of the formula

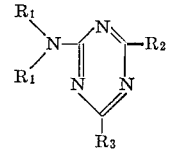

wherein $R_1$ is a member of the group consisting of a hydrogen atom and a $C_{1-18}$ hydrocarbon radical and $R_2$ and $R_3$ are each a member selected from the group consisting of

a halogen atom and a hydrocarbon radical;
(i) compounds of the formulas

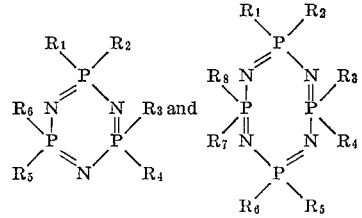

wherein $R_1$, $R_2$, $R_3$, $R_4$, $R_5$, $R_6$, $R_7$ and $R_8$ are each a member of the group consisting of halogen atoms and $-N(R')_2$ of which $R'$ is a member of the group consisting of a hydrogen atom and a $C_{1-18}$ hydrocarbon radical;
(j) compounds of the formula

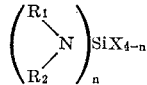

wherein $R_1$ is a member of the group consisting of a hydrogen atom and a $C_{1-8}$ hydrocarbon radical, $R_2$ is a $C_{1-8}$ hydrocarbon radical, X is a member of the group consisting of a $C_{1-12}$ hydrocarbon radical and a halogen atom and $n$ is an integer from 1 to 4;
(k) compounds of the formulas

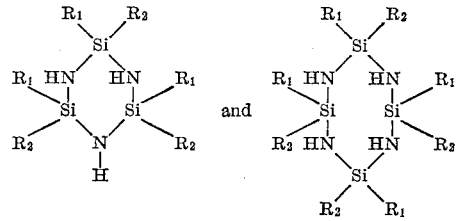

wherein $R_1$ and $R_2$ are each a $C_{1-8}$ hydrocarbon radical;
(l) compounds of the formula

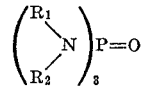

wherein $R_1$ and $R_2$ are each a $C_{1-8}$ hydrocarbon radical;
(m) compounds of the formula

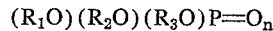

wherein $R_1$, $R_2$ and $R_3$ are each a $C_{1-8}$ hydrocarbon radical and $n$ is an integer from 0 to 1;
(n) compounds of the formula

wherein $R_1$, $R_2$ and $R_3$ are each a member of the group consisting of a hydrogen atom and a $C_{1-8}$ hydrocarbon radical and $n$ is an integer from 0 to 1;

(o) compounds of the formula $$PO_nX_3$$

wherein X is a halogen atom, and $n$ is an integer of from 0 to 1;

(p) compounds of the formula $$SO_nX_2$$

wherein X is a halogen atom and $n$ is an integer of from 1 to 2;

(q) compounds of the formula $$RSO_nX$$

wherein R is a $C_{1-12}$ hydrocarbon radical, X is a halogen atom, and $n$ is an integer from 1 to 2;

(r) compounds of the formula

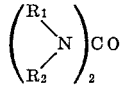

wherein $R_1$ and $R_2$ are each a member of the group consisting of a hydrogen atom and a $C_{1-8}$ hydrocarbon radical;

(s) compounds of the formula

wherein $R_1$ and $R_2$ are each $C_{1-12}$ hydrocarbon radical and $n$ is an integer from 1 to 2;

(t) compounds of the formula

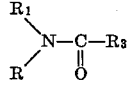

wherein $R_1$ and $R_2$ are each a member of the group consisting of a hydrogen atom and a $C_{1-8}$ hydrocarbon radical, and $R_3$ is a member of the group consisting of a hydrogen atom and a $C_{1-12}$ hydrocarbon radical;

(u) compounds of the formula

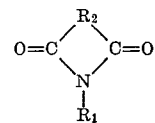

wherein $R_1$ is a member of the group consisting of a hydrogen atom and a $C_{1-8}$ hydrocarbon radical and $R_2$ is a divalent $C_{2-12}$ hydrocarbon radical;

(v) compounds of the formula

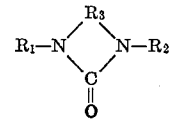

wherein $R_1$ and $R_2$ are each a member of the group consisting of a hydrogen atom and a $C_{1-8}$ hydrocarbon radical, and $R_3$ is a divalent $C_{2-12}$ hydrocarbon radical; and (w) the salts of inorganic and organic acids which are formed with the compounds indicated by the general formulas in (a), (b) and (c) above.

References Cited

UNITED STATES PATENTS

| | | | |
|---|---|---|---|
| 2,877,248 | 3/1959 | Reuter et al. | 260—448 |
| 3,035,077 | 5/1962 | Johnson et al. | 260—448 |
| 3,325,524 | 6/1967 | Lundeen | 260—448 |
| 3,381,024 | 4/1968 | Toyoshima et al. | 260—448 |

JOSEPH L. SCHOFER, Primary Examiner

E. J. SMITH, Assistant Examiner

U.S. Cl. X.R.

252—429, 431; 260—88.2, 93.1, 93.5, 93.7, 94.9, 448

UNITED STATES PATENT OFFICE
CERTIFICATE OF CORRECTION

Patent No. 3,534,006  Dated  October 13, 1970

Inventor(s) Kamaishi et al

It is certified that error appears in the above-identified patent and that said Letters Patent are hereby corrected as shown below:

Column 30, line 11, change $C_{5-18}$ to read "$C_{2-12}$"

Column 31, line 61, change hyddogen to read "hydrogen"

SIGNED AND
SEALED
JAN 26 1971

(SEAL)
Attest:

Edward M. Fletcher, Jr.
Attesting Officer

WILLIAM E. SCHUYLER, JR.
Commissioner of Patents